Jan. 28, 1930.  F. HEDLEY ET AL  1,744,891
PASSENGER VEHICLE
Filed Sept. 11, 1928    4 Sheets-Sheet 1
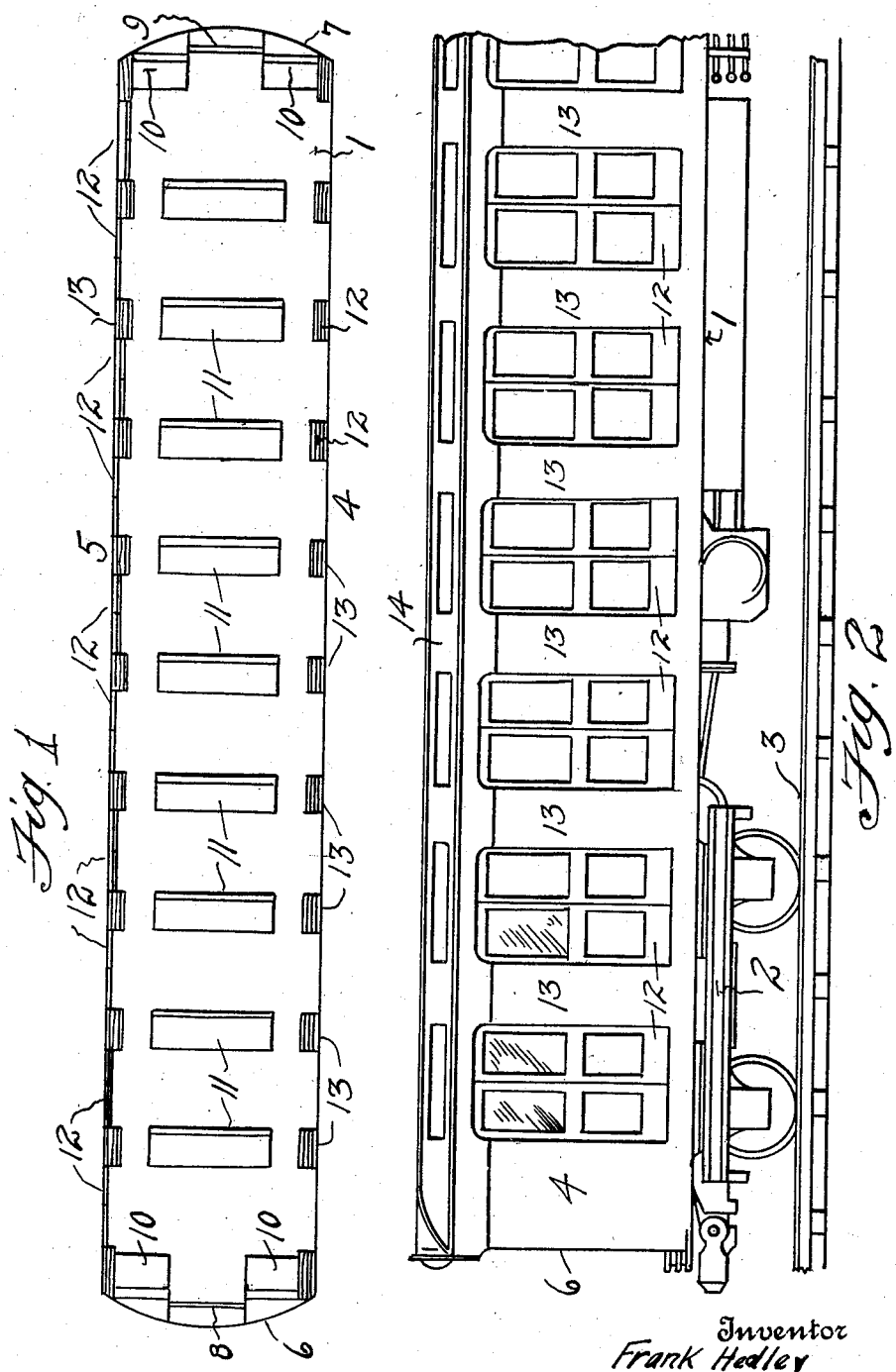
Inventor
Frank Hedley
James S. Doyle
By their Attorneys
Darby & Darby

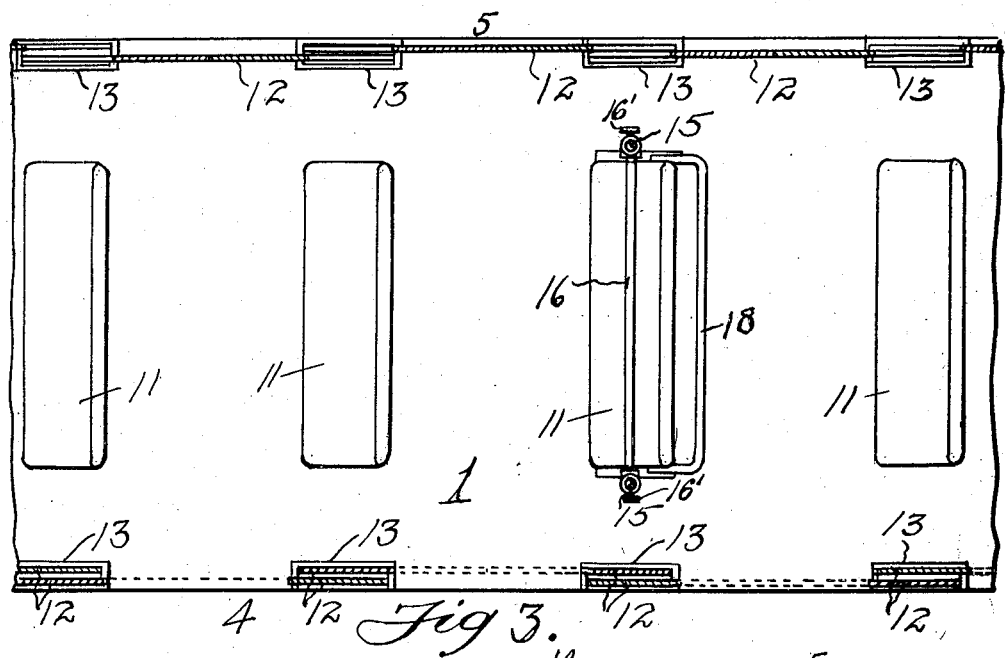
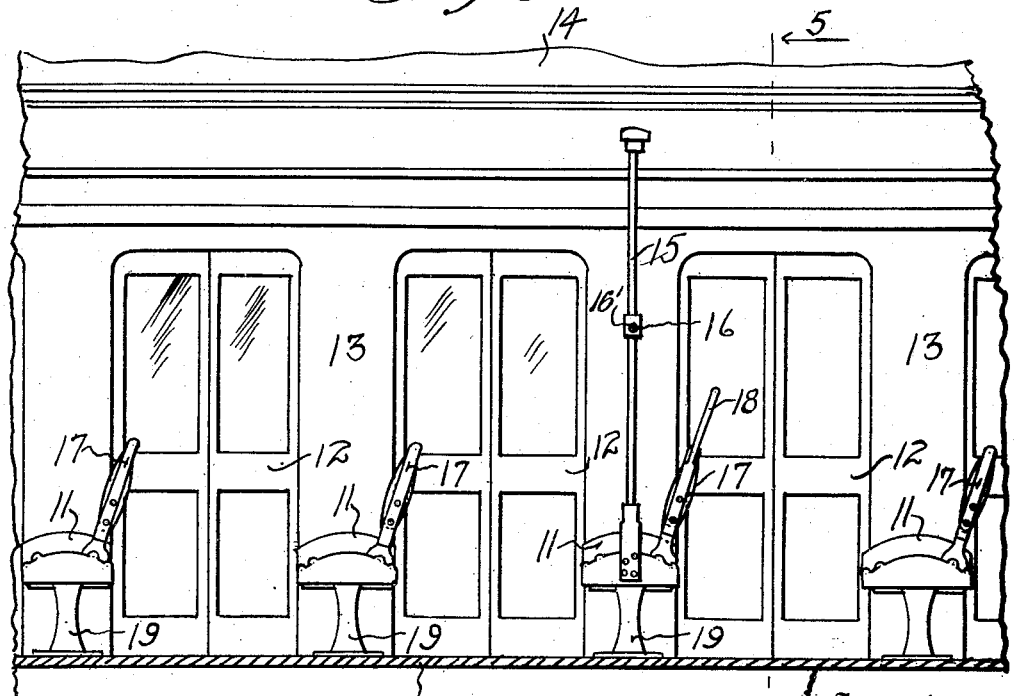

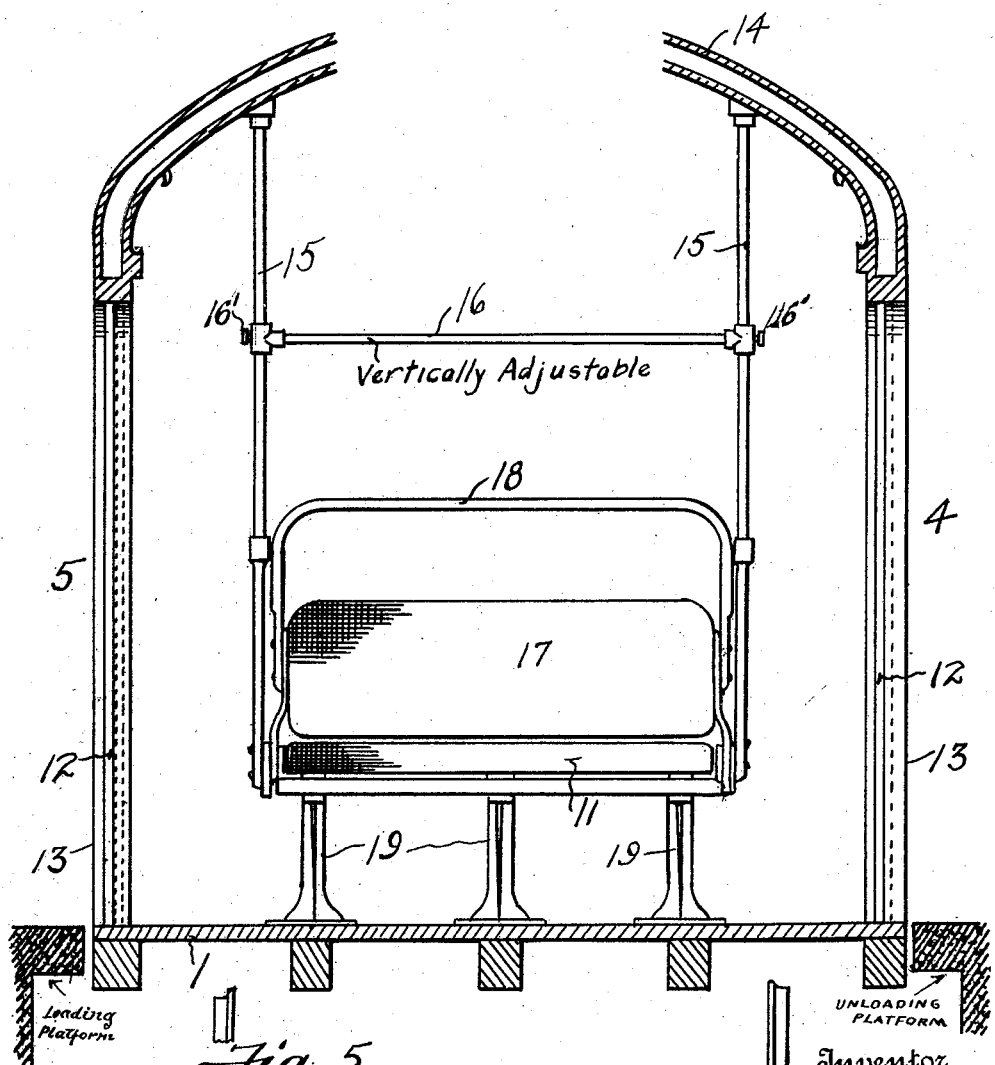

Jan. 28, 1930.  F. HEDLEY ET AL  1,744,891
PASSENGER VEHICLE
Filed Sept. 11, 1928   4 Sheets-Sheet 4

Inventor
Frank Hedley
James S. Doyle
By their Attorneys
Darby & Darby

Patented Jan. 28, 1930

1,744,891

UNITED STATES PATENT OFFICE

FRANK HEDLEY, OF YONKERS, AND JAMES S. DOYLE, OF MOUNT VERNON, NEW YORK

PASSENGER VEHICLE

Application filed September 11, 1928. Serial No. 305,171.

This invention relates in general to improvements in passenger vehicles, such as the cars employed in all types of multiple car passenger trains.

One of the objects of this invention is the provision of a vehicle or car construction of such a nature that passengers can board and alight therefrom with greater ease and greater rapidity than has been possible with the car constructions now generally in use and as a result the time at which the car is detained at a station for the purpose of passenger loading and unloading is reduced to a minimum and, therefore, more trains per hour can be operated.

Another object of this invention is the provision of a vehicle or car construction with maximum total door opening space per side, thus providing for a maximum number of doorways per side, thereby effecting the most efficient distribution of passengers when boarding and alighting.

Another object of this invention is the provision and arrangement of pockets or recesses in the sides of the vehicle or car to permit doors to overlap in pockets when they are opened.

A still further object of this invention involves the rearrangement of the seats within the vehicle to permit of ease and rapidity of movement of the passengers within the vehicle as they pass through the doors in either direction.

A still further object of this invention, is the provision of a flexible seating arrangement within the vehicle by means of which additional standing space can be provided, thereby increasing the carrying capacity to meet conditions arising during rush hour periods while during nonrush hours a maximum number of seats are provided.

A still further object of this invention is the provision of a vehicle having a seating arrangement which provides two aisles, one down each side of the car between the car sides, and the seat ends which extend the entire length of the car.

A still further object of this invention involves the seating arrangement of a vehicle in which provision is made to increase the carrying capacity of the car when necessary by folding up every other seat into a minimum space, thus providing additional standing room and also an enlarged space between the remaining seats, which contributes very largely to the facility and speed of movment of the passengers boarding and alighting from the car.

A still further object of this invention involves the seating arrangement of a vehicle in which an enlarged space is provided between adjacent cross seats which contributes very largely to the facility and speed of movement of the passengers boarding and alighting from the car.

A further object of the invention is to provide a car and car seating arrangement especially adapted for use with separate platforms for loading and unloading thereby permitting maximum speed or operation with maximum carrying capacity.

These and other objects as will appear from the following disclosure are secured by means of this invention.

This invention resides substantially in the construction, combination, arrangement and relative location of parts, all as will appear more fully below.

Referring to the drawings in which one embodiment of this invention is disclosed,—

Figure 1 is a plan view of the vehicle with the top removed, looking down into the vehicle;

Figure 2 is a side elevational view of the vehicle showing about one-half thereof;

Figure 3 is an enlarged detail plan view showing in more detail the features of construction;

Figure 4 is an interior elevational view showing the supporting bars or stanchions in one form;

Figure 5 is a vertical cross sectional view through the vehicle showing one of the seats and the supporting bars or stanchions;

Figure 6 is a cross sectional view through a section of the car side showing the door pockets or recesses;

Figure 7:
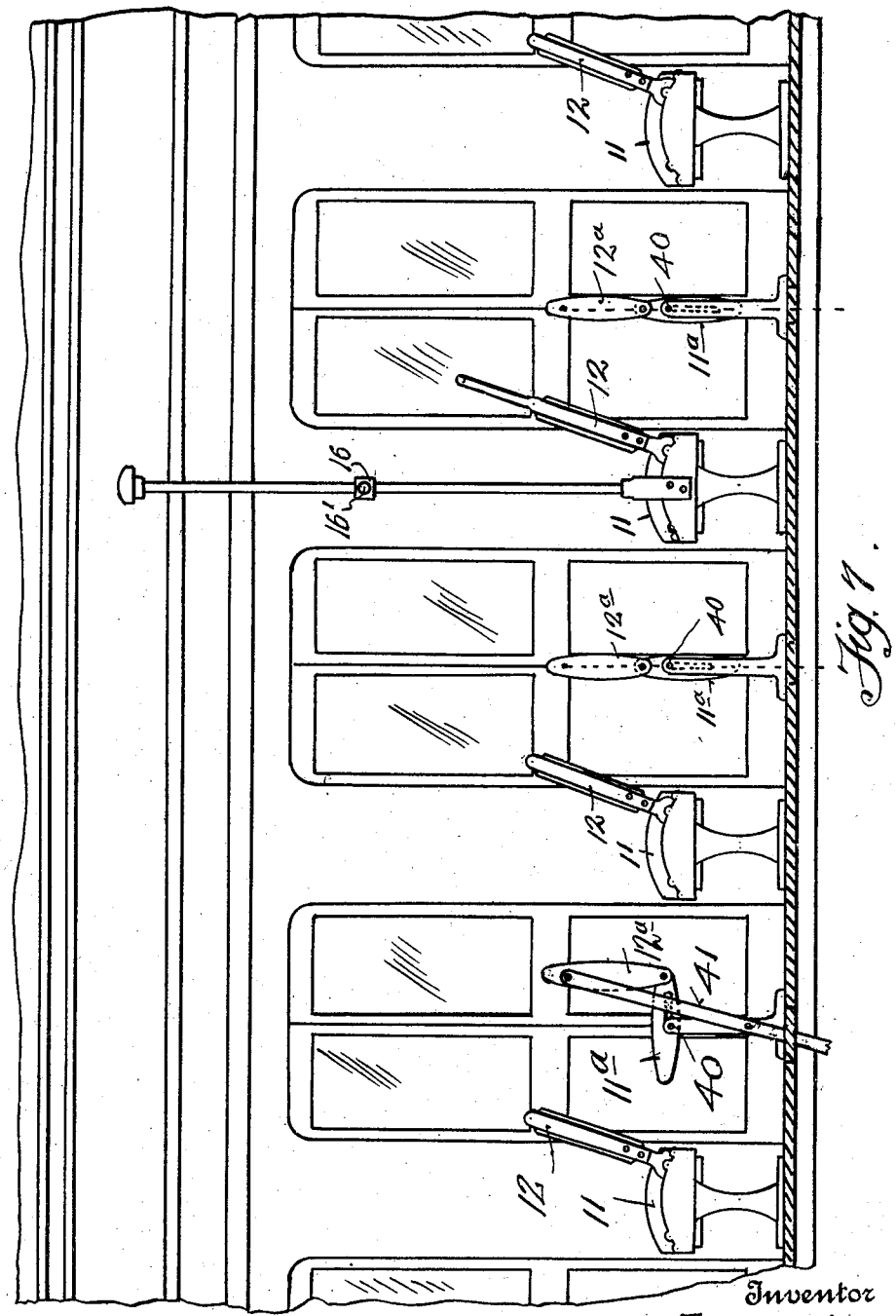
Figure 7 is a view similar to Figure 4 showing a modified embodiment of our invention.

Under present day conditions in congested areas the problem of effecting the rapid transit of large numbers of passengers has become acute. Many expedients have been resorted to in an effort to increase the number of passengers per hour without undue discomfort as well as the number of trains per hour, without disrupting the smooth and efficient operation of the entire system. By means of the car of this invention it is believed that a maximum number of passengers may be carried in a minimum time without discomfort for the passengers. The construction of this car is such that passengers can board and alight therefrom at such increased speed over cars now in use that the time at which a train is delayed at a station is reduced to a minimum so that more trains per hour can be operated.

To effect these results in one embodiment of the invention selected for illustration the car is provided with ten doorways on each side, the doorways being formed by vertical posts which are recessed to form pockets into which the doors move as they open. These posts which form part of the car sides are arranged at regular intervals longitudinally of the car and in transverse alignment. The seats within the car extend transversely thereof and in transverse alignment with the posts. The seats do not extend across the entire width of the car but terminate at each end so as to provide a longitudinal aisle down each side of the car. The car is also provided with seats at each end which may be mounted on hinges, if desired, as well as a door at each end of the car to permit the movement of passengers from one car to another. The backs of the seats are provided with hand rails for supporting the passengers and the sides are provided with vertical stanchions connected by a transverse member to also provide supports for the passengers.

Referring to the drawings for a better understanding of the invention, the vehicle is shown at 1 as provided with a floor, platform, chassis or the like. The platform 1 is supported on each end by standard trucks 2 which run, as indicated in Fig. 2, on the rails 3. For purposes of reference the car has been shown as provided with two side walls, indicated generally by the reference numerals 4 and 5 and the end walls of the car are shown at 6 and 7. A passageway is provided at each end of the car which can be closed off by means of the doors indicated at 8 and 9. Within the interior of the car at each end and on each side of the passageway are provided seats 10 which may be mounted on hinges so that they can be swung up against the side or end wall for any desired purpose as, for instance, to provide room if desired for the motorman. Extending down the center of the car and transversely thereof are seats 11 which are shown as terminating at each end a sufficient distance from the car side walls to permit the movement of passengers therebetween.

The doors are indicated at 12 and in the structure shown for illustration (but to which we do not desire to be limited) there are ten passageways, on each side of the car provided with doors which are of the sliding type comprising two sections mounted so that the two sections of any one door slide in opposite directions from each other. Forming in connection with the doors the complete side walls are the posts 13 which are recessed to form pockets into which the door sections may slide. It may be pointed out here that any of the many well known types of mechanism may be used for operating the doors, and may be supported either over the doors or below them as desired.

As is clear from the drawings, the alternate doors are out of longitudinal alignment with each other. As shown clearly in Fig. 6, the posts 13 are provided with pockets 20 into which the adjacent sections of adjacent doors move in opposite directions. It will be at once apparent that by this arrangement a maximum number of doorways and door opening spaces is provided on the car. The top of the car has been indicated at 14, and may, of course, be of any desired construction and provided with ventilators, as indicated. The top of the car is supported on the end walls and posts 13.

As illustrated in Figs. 3, 4 and 5, a vertical stanchion 15 may be provided at each seat and extending from each end thereof to the top of the car. A transverse vertically slidable bar 16 is supported on the spaced vertical stanchions 15 and arranged to be secured at the desired vertical point by set screws 16' so as to place it at the proper heighth for the average passenger. The seats 11, which are of any standard construction, have been illustrated as of the type in which the backs 17 may be moved between two extremes so that the passengers seated thereon may always face in the direction in which the vehicle is moving. The back of the seat may be provided with a transverse hand rail 18. The space between adjacent seats is of sufficient width to allow two rows of passengers to stand without discomfort to themselves or to those seated. Those passengers standing in front of the seat may grasp hand rail 16, while those standing in back may grasp hand rail 18, and those at the ends may grasp the vertical stanchions 15.

In the form of seat shown but to which we do not desire to be limited stops may be employed for the back to hold it in either extreme so that when the vehicle is retarded the pressure of the passengers against the back will not cause the back to move. The seats are shown supported by any suitable form of standard 19. While the hand rails 15, 16 and 18 have only been shown as applied to one seat it is of course, to be understood that they may be applied to all of the seats.

From the foregoing description it will be seen that by means of a number of novel features a car is provided in which the maximum rate of free and unobstructed ingress and egress of passengers is secured. This results in reducing the time at which a train is held at a station and hence the number of trains per hour that can be operated is materially increased. By the seating arrangement within the car the passengers may easily move through the doorways.

It may be pointed out that one important advantage of this arrangement is that because of the plurality of the doorways the number of passengers awaiting to board the car at any one doorway is considerably reduced. In the ordinary form of car in which only three or four doorways are provided the number of passengers at any doorway is large and this results in obstructing the egress of passengers from the car.

This invention enormously facilitates and speeds up the movement of passengers and avoids congestion at the station platform and as a result avoids unnecessary crowding and jostling of passengers during the boarding and alighting of passengers. It is apparent that this invention permits the transfer of a maximum number of passengers with a minimum lapse of time or discomfort to the passengers. It is also apparent that the seating arrangement employed enormously increases the available standing space. While this is at the expense of seating capacity per car, the seats per hour are practically the same as with the ordinary type car, which is made possible by the increased number of trains per hour permitted by this invention. During rush hours, the advantage of increased comfortable, uncrowded, uncongested, standing space outweighs the objection of reducing, seating space per car. This is particularly true, when it is considered that the total seating space per hour is thus materially increased. The arrangement of hand rails is also of such a nature as to provide all passengers with means for steadying themselves.

By means of the ability to speed up the boarding and alighting of passengers with less discomfort to them a material increase in the number of cars or trains per period of time can be obtained. Similarly due to the fact that excessive congestion of passengers at entrance doors is practically eliminated even during rush hours which factor, of course, is of importance on the question of speed of operation a greater number of passengers may be handled in the lessened amount of time.

As compared with the ordinary standard type of car of equal size, a car of this invention will permit an increase of the number of trains per hour of approximately thirty percent and an increase of the total number of passengers more comfortably transported of approximately thirty-five percent. From these figures the importance and value of the invention may readily be appreciated.

The car of our invention is particularly adapted to a system of loading and unloading passengers which is coming more generally into use, wherein the car or trains of cars comes to rest between two platforms, one platform being used for loading passengers on to the car and the other platform being used for unloading passengers off from the car. Such an arrangement is shown in Fig. 5. In this type of station, it is customary for the car to come to rest and the door on the unloading side of the car opened to permit the discharge of passengers before the doors on the loading side of the car are opened. Where the car is provided with the usual three or four doors, and a large number of passengers desire to alight from the car at that station, it will be apparent that congestion at those doors necessitates a delay in the opening of the doors on the loading side of the car to avoid obstruction to the free egress of the passengers desiring to leave the car by passengers rushing into the car.

In the car of our invention however, the doors may be opened simultaneously or as near simultaneously as practical, inasmuch as the egress space or door openings permit egress from the car practically throughout its length. Thus there is no aisle to be clogged up by passengers going in opposite directions and therefore there is no object in delaying the entrance of passengers while the passengers are leaving the car from the opposite side thereof.

Furthermore it may be desired to make the seating capacity of the car collapsible. That is to say it may be desired to increase the seating capacity during the nonrush hours at the cost of total capacity of passengers and decrease the seating capacity of the car during rush hours thereby comfortably increase the total capacity of the car by providing additional standing space. Such an arrangement is shown in Figures 7, wherein as merely illustrative of the principle involved alternate seats are of a collapsible type. As shown the seat $11^a$ is pivotally mounted at 40 and it is likewise pivotally secured to the seat back $12^a$. A rod 41 is secured to the seat back $12^a$, and if desired may extend through the flooring of the car as shown for automatic or manual operation. When it is desired to collapse the seats, the seat $11^a$ is moved about its pivotal support into alignment with the seat back held in place by the operating rod 41.

The collapsible seat is shown in its extended position and the two rear succeeding alternate collapsible seats are shown in their collapsed form with the actuating rod removed to permit clearer illustration. The seat structure as well as its actuating mechanism forms no part of the present invention, as it forms the subject matter of separate applications specifically directed thereto. The present case being confined to the broad principle of car structure and seating arrangement allow collapsibility in carrying capacity.

It will be seen however that by collapsing alternate or any desired number of seats additional standing capacity is secured and the collapsed seats form rests or supports which the standing passengers may utilize to steady themselves in transit.

It will be apparent therefore, that we have embodied certain principles in a car construction by means of which the results of this invention are secured and we do not therefore wish to be limited to the exact features of construction illustrated in the drawings and described in the specification for purposes of disclosure but rather to the principles of the invention by means of which these results are secured.

We are well aware that many changes in the details of construction and relative arrangement of parts will readily occur to those skilled in this art, and we intend therefore, to be limited only by the scope of the appended claims.

What we seek to secure by United States Letters Patent is:

1. In a passenger vehicle of the type described, the combination comprising a car body having a plurality of passageways therein, vertical posts between said passageways and forming part of the car sides, said posts being recessed and double sliding doors in each passageway arranged to move in opposite directions into the recessed posts.

2. In a passenger vehicle of the type described the combination comprising a car body, a maximum number of passageways in each side of the car body for the movement of passengers therethrough, double sliding doors mounted in each passageway, and collapsible seats extending transversely of the car body, said seats terminating at each end to provide a longitudinal aisle down each side of the vehicle of sufficient width to permit the movement of passengers therethrough and said seats when collapsed forming clear transverse aisles in alignment with the passageways.

3. In a passenger vehicle of the type described the combination comprising a car body having a plurality of passageways in each wall thereof, vertical posts between each passageway having recesses therein, double sliding doors arranged in each passageway so as to move into the recesses in said posts and seats extending transversely of the vehicle in alignment with said vertical posts.

4. In a passenger vehicle of the type described the combination comprising a car body having a plurality of passageways in each wall thereof, vertical posts between each passageway having recesses therein, double sliding doors arranged in each passageway so as to move into the recesses in said posts and transversely extending seats within the vehicle in alignment with said posts and terminating at each end to provide a space between the said ends and the posts.

5. In a passenger vehicle of the type described the combination comprising a car body having a plurality of passageways in each wall thereof, vertical posts between each passageway having recesses therein, double sliding doors arranged in each passageway so as to move into the recesses in said standards, transversely extending seats within the vehicle in alignment with said posts and terminating at each end to provide a space between the said ends and the posts, and seats at each end of the vehicle on each side thereof spaced apart to provide a passageway therebetween.

6. In a passenger vehicle of the type described the combination comprising a car body having side and end walls, a passageway in each end wall and a door in said passageway, seats at each end of the vehicle arranged on each side of the passageway at the end of the vehicle, side walls having a plurality of passageways, vertical posts arranged along the side of the vehicle at regular intervals for dividing the passageways and forming part of the vehicle side walls, said standards being recessed, double sliding doors in each passageway mounted to move into the recessed standards when the doors are opened, and transverse seats in alignment with the vertical standards and terminating a short distance therefrom to provide longitudinal aisles down each side of the vehicle.

7. In a passenger vehicle of the type described the combination comprising a car body having side and end walls, a passageway in each end wall and a door in said passageway, seats at each end of the vehicle arranged on each side of the passageway at the end of the vehicle, side walls having a plurality of passageways, vertical posts arranged along the side of the vehicle at regular intervals for dividing the passageways and forming part of the vehicle side walls said posts being recessed, double sliding doors in each pasageway mounted to move into the recessed standards when the doors are opened, transverse seats in alignment with the vertical standards and terminating a short distance therefrom to provide longitudinal aisles down each side of the vehicle, and hand rails supported on each seat.

8. In a passenger vehicle of the type described, the combination comprising a car body having side walls comprising a plurality of recessed vertical posts arranged at regular intervals to provide a plurality of passageways on each side of the vehicle, double sliding doors in each passageway adapted to move into the recessed posts when the doors are opened, transverse seats within the vehicle in alignment with the standards and terminating short thereof to provide longitudinal aisles, said seats having oscillatable backs, hand rails on the back of each seat, and hand rails attached to each end of the seats comprising vertical stanchions and a transverse vertically adjustable hand rail supported on said stanchions.

9. In a passenger vehicle of the type described, the combination comprising a car body having a plurality of passageways therein, vertical posts between said passageways and forming part of the car sides, said posts being recessed and double sliding doors in each passageway arranged to move in opposite directions into the recessed posts, the number of doors being dependent solely upon the length of the car.

In testimony whereof we have hereunto set our hands on this 6th day of August, A. D. 1928.

FRANK HEDLEY.
JAMES S. DOYLE.